Jan. 15, 1957  E. O. SCHONSTEDT  2,777,336
INDEX MECHANISM
Filed Oct. 17, 1952  3 Sheets-Sheet 1

INVENTOR
ERICK O. SCHONSTEDT

BY
J. O. O'Brien
R. M. Hicks
ATTORNEYS

Jan. 15, 1957  E. O. SCHONSTEDT  2,777,336
INDEX MECHANISM

Filed Oct. 17, 1952  3 Sheets-Sheet 3

INVENTOR
ERICK O. SCHONSTEDT

BY
ATTORNEYS

United States Patent Office
2,777,336
Patented Jan. 15, 1957

2,777,336
INDEX MECHANISM

Erick O. Schonstedt, Silver Spring, Md., assignor to the United States of America as represented by the Secretary of the Navy Application October 17, 1952, Serial No. 315,440

8 Claims. (Cl. 74—527)

(Granted under Title 35, U. S. Code (1952), sec. 266)

The invention described herein may be manufactured and used by or for the Government of the United States of America for governmental purposes without the payment of any royalties thereon or therefor.

The present invention relates to an index mechanism and more particularly to a means for accurately turning the shaft of a synchronous control transformer through a predetermined angle.

In the operation of a magnetic airborne detector such as that disclosed in my copending application, Serial No. 187,653, filed September 29, 1950, now Patent No. 2,687,507, it is essential to provide a means for accurately determining the angular rotation in azimuth and elevation of the detector coil. There is provided a synchronous transmitter which transmits to a transformer a signal correlative of the angular rotation of the detector coil. A recorder is connected to the transformer to receive this signal. This recorder is calibrated for a ten degree range and hence it is necessary to bring the signal within that range. This is accomplished by the present invention which provides an index mechanism for driving the synchronous transformer rotor through predetermined angles in five degree steps. This index mechanism is designed to provide a means for compensating for inaccuracies in the synchronous transformer and transmission means and to insure an accuracy of within a quarter of a minute. The present mechanism is so constructed as to reduce frictional forces to a minimum whereby the accuracy of the device is not appreciably affected by wear.

An object of the present invention is to provide an index mechanism for accurately rotating a shaft through predetermined angles.

A further object of this invention is to provide an index mechanism for positioning the shaft of a synchronous transformer, the index mechanism having compensating means to allow for inaccuracies in the transmission system.

Still another object of this invention is to provide an index mechanism of rugged construction which permits a high degree of accuracy in rotating a shaft through a predetermined number of degrees and which minimizes frictional forces.

Other objects and many of the attendant advantages of this invention will be readily appreciated as the same becomes better understood by reference to the following detailed description when considered in connection with the accompanying drawings wherein.

Figure 1:
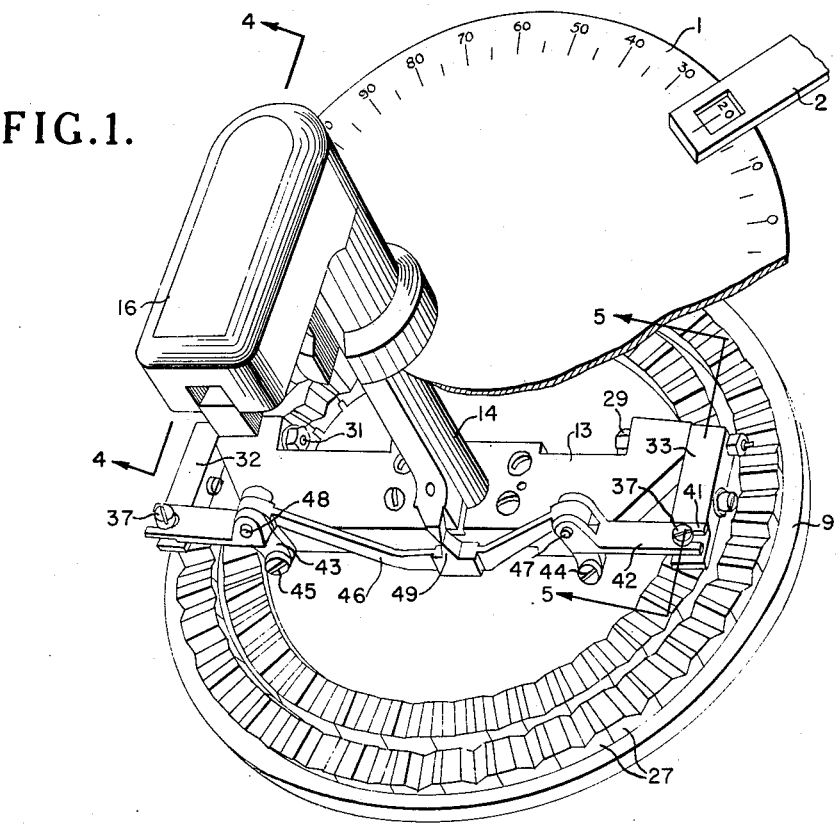
Fig. 1 is a perspective view of the index mechanism with the dial broken away to show certain details.

Referring now to the drawings wherein like numerals indicate like parts throughout the several views and more particularly to Fig. 1 there is shown a dial 1 which is adapted to rotate with the operating handle and which indicates the angular rotation of the shaft of the synchronous transformer. There is provided a member 2 which is fixed to a housing (not shown) within which the index mechanism is adapted to be disposed. This member is provided with a window and pointer to indicate the angle in degrees. The synchronous transformer 3 (Fig. 2) is connected through a coupling 4 to a shaft 5. This coupling provides a means for accurately aligning and connecting the transformer and index shafts and is more fully disclosed in my copending application, Serial No. 187,653, filed September 29, 1950, now Patent No. 2,687,507. Coupling 4 is disposed in a housing 6 which is provided with a cover plate 7 secured thereto by screws 8. The housing 6 is formed integrally with a plate 9 upon which is mounted the operative elements of the index mechanism. This plate is fixedly mounted within the control box or housing (not shown) within which the index mechanism is disposed.

Shaft 5 is journalled in bearings 11 and 12 in plate 9 and extends upwardly through an arm 13 (Fig. 1) and is suitably connected with shaft 14. Arm 13 is secured to shaft 14 as by a set screw (not shown) so that rotation of shafts 14 and 5 will produce rotation of arm 13.

Figure 2:
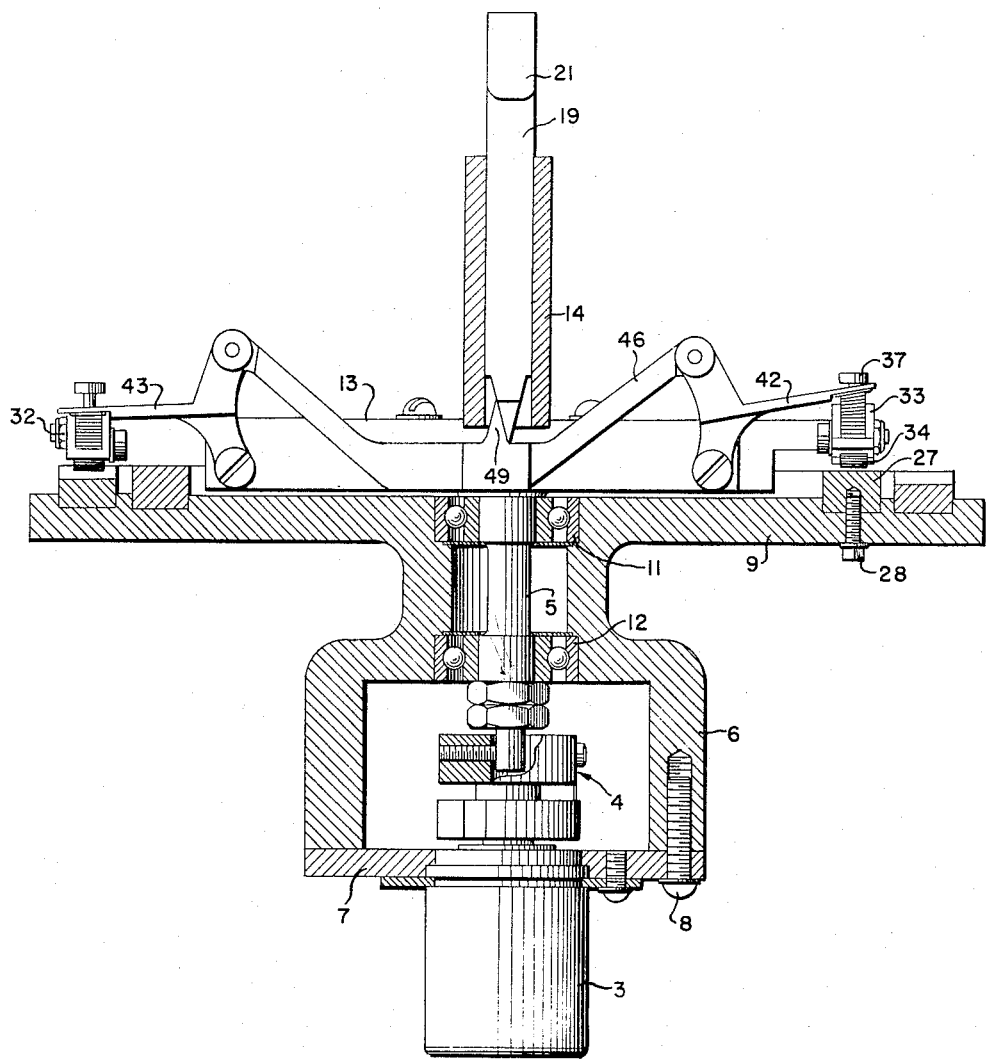
Fig. 2 is a sectional view in elevation with the operating handle omitted showing the index mechanism in the locked position.
Figure 4:
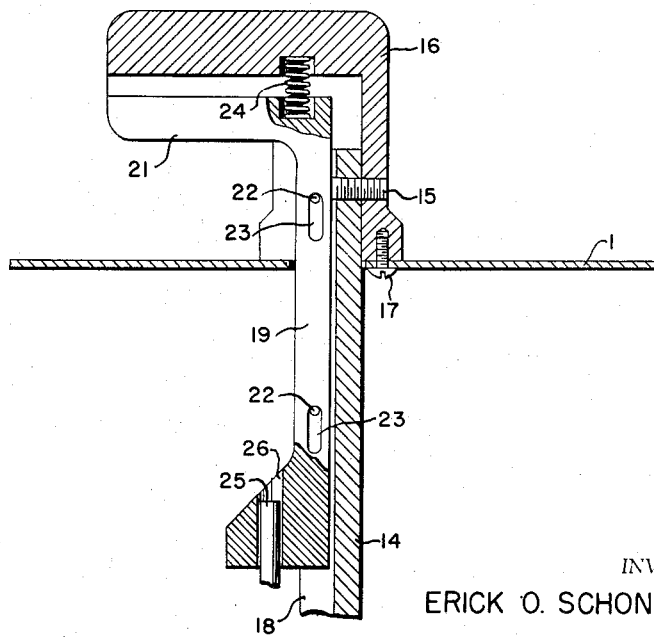
Fig. 4 is a sectional view of the handle taken along the line 4—4 of Fig. 1.

Secured to the upper portion of shaft 14 by means of screw 15 is a handle 16 (Fig. 4). The handle is secured to the dial 1 by means of screws 17. Slidably disposed within a recess or slotted portion 18 in shaft 14 is a plunger 19 which is provided with a pistol grip portion 21 disposed within a recess in handle 16. Plunger 19 is maintained in position by means of pins 22 the end portions of which are fixed in shaft 14 and which are disposed within slots 23 in plunger 19. Spring 24 urges the plunger to the lower position thereof as shown in Fig. 2. Arm 13 is provided with a pin 25 (Fig. 4) which extends upwardly therefrom into an aperture 26 in the wedge shaped end portion of the plunger 19. This pin serves to properly align the plunger during movement thereof. The plunger and wedge perform a function to be described in detail hereinafter.

Mounted within circular grooved portions of plate 9 is a plurality of blocks 27 having V-shaped grooves therein. These blocks are arranged in concentric rings within plate 9 and each block is maintained in position by a screw 28 (Fig. 2) which extends through a slotted portion (not shown) of plate 9 into the tapped under portions of the blocks. The V-shaped grooves in adjacent blocks are spaced 10° apart and the V-grooves in the inner and outer rings are staggered so that a 5° spacing is maintained between grooves in the inner and outer rings. There is provided a small amount of clearance between adjacent blocks so that the screws 28 which retain the blocks in position may be loosened and the position of the block adjusted to correct for any inaccuracies in the synchronous transformer and transmission means.

Figure 5:
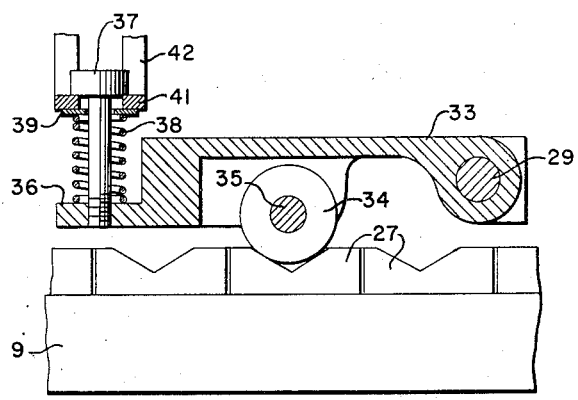
Fig. 5 is a sectional view of the roller housing taken along the line 5—5 of Fig. 1.

Pivotally mounted on the outer ends of arm 13 by means of pivots 29 and 31 (Fig. 1) are roller housings 32 and 33. In Fig. 5 the housing 33 is shown in section. The roller 34 which is rotatably mounted on shaft 35 engages blocks 27. Adjacent the free end of housing 33 there is provided a recessed portion 36 and a headed pin 37 is fixedly mounted therein. A spring 38 is provided with a washer 39 on the upper surface thereof. This washer is engaged by the bifurcated end portion 41 of a T-shaped link 42. The housing 32 is similarly constructed and is provided with a T-shaped link 43. It can be seen that the roller in housing 33 engages the inner ring of blocks 27 whereas the roller in housing 32 engages the outer ring of blocks. As the arm 13 is rotated the rollers will alternately engage V grooves in the inner and outer rings of blocks whereby the arm 13 and shaft 14 are moved in 5° steps.

Figure 3:
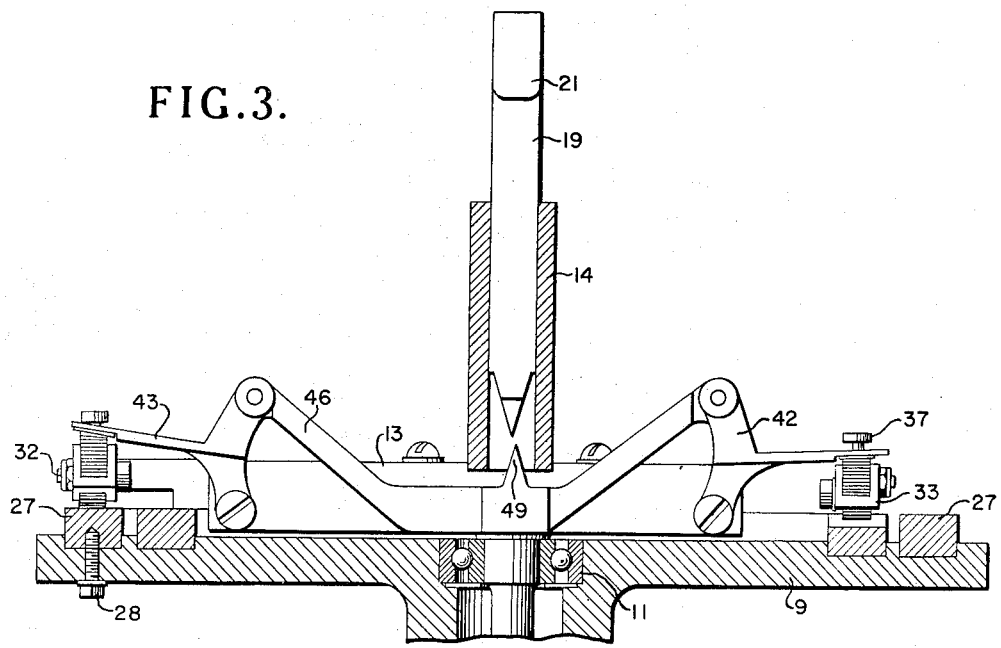
Fig. 3 is a view similar to Fig. 2 but showing the mechanism in the unlocked position.

Means is provided to accurately align and retain the rollers within the V grooves. The T-shaped links 42 and 43 are pivoted to the arm 13 at 44 and 45 respectively and are pivoted to a linkage connecting bar 46 at 47 and 48 respectively. This bar is provided with an upstanding wedge 49 which is engaged by plunger 19. When the plunger 19 is in the position shown in Fig. 3 and the handle 16 is rotated to rotate arm 13, it can be seen that the connecting bar 46 will shift from one side of a center position to the other as the rollers alternately engage V grooves and the flat portions of the blocks. The connecting bar 46 shifts to equalize the tension of springs 38 so that a minimum force is exerted by the rollers against the blocks. In this manner frictional wear of these parts is reduced.

The operation of the apparatus herein disclosed is as follows. The handle 16 is grasped and portion 21 is squeezed to compress spring 24 (Fig. 4) and raise the plunger 19 to the position shown in Fig. 3. The handle 16 is then rotated, rotating dial 1, shaft 14, arm 13 and shaft 5 until the rotor of the synchronous transformer 3 is in the desired position. Portion 21 of plunger 19 is then released and the plunger is forced downwardly by spring 24 into engagement with wedge 49. By reason of this engagement the connecting bar 46 is forced slightly sidewards whereby T link 42 engages the head on pin 37 and lifts the housing 33 and roller 34 from engagement with blocks 27 as seen in Fig. 2. The T link 43 forces the spring on housing 32 downwardly whereby the roller in the housing firmly engages the V groove in block 27. In this manner the plunger and linkage mechanism serve both to precisely locate one of the rollers in a V groove and to raise the other roller to reduce frictional wear of the roller and blocks. Since the blocks are so arranged that first the roller on one end of arm 13 is engaged and then the roller on the other end of the arm is engaged, the wedge 49 on connecting bar 46 is always positioned on one or the other side of a center position.

The herein disclosed index mechanism provides a means for accurately positioning the rotor shaft of a synchronous transformer and provides for adjustability to compensate for inaccuracies in the system. Frictional wear is reduced to a minimum by the lifting of the roller which is not in use and a positive means is provided to precisely locate the shaft by the compression of the spring to center the roller in the V groove.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. An indexing mechanism for rotating a shaft through a predetermined number of degrees comprising a rotatable shaft, an arm fixedly mounted on the shaft and normal thereto, a fixed circular plate coaxially mounted with respect to said rotatable shaft, locating means formed in said circular plate, said locating means comprising a plurality of blocks having V-shaped grooves therein, roller means mounted on said arm and spring urged into engagement with said locating means, and release means mounted on said shaft adapted to lift said roller means from engagement with the locating means.

2. In a device of the class described, a rotatable shaft, an arm fixedly mounted on said shaft and normal thereto, a pair of housings, one of said housings being pivoted to each end of said arm, rollers rotatably mounted within said housings, fixed detent means coaxially mounted with respect to said shaft and disposed along the path of movement of said rollers as said arm is rotated, said rollers normally engaging said detent means, and means operatively connected to said housings and adapted to disengage one of said rollers from the detent means.

3. In a device of the class disclosed, an index mechanism comprising, a rotatable shaft, an arm fixed to said shaft and normal thereto, fixed locating means coaxially mounted with respect to said rotatable shaft, said locating means comprising two concentric rings of blocks having V grooves therein and flat portions therebetween, midpoints of adjacent blocks in each ring being spaced 10° apart, the V grooves in the inner ring being disposed equidistantly between the V grooves in the outer ring, a pair of housings respectively pivoted on each end of said arm, rollers disposed within said housings, the roller disposed on one end of said arm engaging the outer ring, the roller disposed on the other end of said arm engaging the inner ring, and means for forcing one of said rollers into a V groove and simultaneously lifting the other of said rollers out of engagement with a block.

4. An index mechanism for rotating a shaft of a synchronous transformer through predetermined angles comprising, in combination, a rotatable shaft, an arm fixed to said shaft and normal thereto, a pair of housings having rollers mounted therein, one of said housings being pivoted to each end of said arm, fixed locating means mounted coaxially with respect to said shaft and disposed along the path of movement of said rollers as said shaft is rotated, spring means disposed on the upper surfaces of said housings, T-shaped links pivotally mounted on said arm and engaging said spring means, a linkage bar pivotally interconnecting said links, and means slidably mounted on said shaft adapted to engage said linkage bar to force the same outwardly along said arm thereby compressing one of the spring means and firmly engaging one of said rollers in the locating means.

5. An index mechanism comprising, in combination, a rotatable shaft, an arm fixedly mounted on said shaft and normal thereto, a pair of rectangular housings, one of said housings being pivoted to each end of said arm, said housings having rollers disposed therein, a fixed ring-shaped member coaxially mounted with respect to said shaft, a plurality of blocks adjustably mounted in concentric circles within said ring-shaped member, each of said blocks having a V-shaped groove therein, the grooves of adjacent blocks being equidistantly spaced, the rollers within said housings being adapted to engage said grooves, and means for forcing one of said rollers into engagement with one of said grooves.

6. In a device of the class disclosed for rotating the shaft of a synchronous transformer through a predetermined number of degrees, a rotatable shaft, an arm fixed to said shaft, roller means pivotally mounted on the ends of said arm, fixed detent means coaxially mounted with respect to said shaft and disposed along the path of movement of said roller means as the shaft is rotated, linkage means pivotally interconnecting said roller means, and plunger means slidably disposed on said shaft adapted to engage said linkage means whereby said roller means is forced into engagement with said detent means.

7. In a device of the class disclosed, an index mechanism comprising, a rotatable shaft, an arm fixed to said shaft and normal thereto, fixed locating means coaxially mounted with respect to said rotatable shaft, said locating means comprising two concentric rings of blocks having V grooves therein, midpoints of adjacent blocks in each ring being spaced 10° apart, the V grooves in the inner ring being disposed equidistantly between the V grooves in the outer ring, a pair of housings having rollers mounted therein, one of said housings being pivoted to each end of said arm, the roller disposed on one end of said arm engaging the outer ring, the roller disposed on the other end of said arm engaging the inner ring, spring means disposed on the upper surfaces of said housings, T-shaped links pivotally mounted on said arm and engaging said spring means, a linkage bar pivotally interconnecting said links, and means slidably mounted on said shaft adapted to engage said linkage bar to force the same outwardly along said arm thereby compressing the spring on one of said housings and simultaneously lifting the other of said housings from engagement with said locating means.

8. An indexing mechanism comprising, a rotatable shaft, an arm mounted on said shaft, fixed detent means coaxially mounted with respect to said rotatable shaft and disposed along the path of movement of the outer ends of said arm, said detent means having V grooves and flats therebetween arranged in a pair of concentric circles, the grooves of one circle being positioned midway between the grooves of the other circle, a pair of roller housings, one of said roller housings being mounted on each end of said arm, rollers mounted within said housings and engaging said detent means, said rollers being arranged to move alternately with respect to each other downward into the V grooves and upward along the flats therebetween, spring means mounted on said housings, and linkage means interconnecting said housings and shiftable as said arm is rotated to equalize the tension of said spring means whereby the frictional force between the rollers and detent means is maintained constant.

References Cited in the file of this patent

UNITED STATES PATENTS

| | | |
|---|---|---|
| 713,858 | Corey | Nov. 18, 1902 |
| 2,533,921 | Dahl | Dec. 12, 1950 |

FOREIGN PATENTS

| | | |
|---|---|---|
| 64,009 | Germany | Aug. 23, 1892 |
| 566,177 | Great Britain | Dec. 18, 1944 |
| 127,460 | Sweden | Feb. 21, 1950 |